Dec. 19, 1950   E. L. ALEXANDER   2,534,213
PULLDOWN DEVICE FOR ROTARY DRILLING APPARATUS
Filed June 24, 1946   3 Sheets-Sheet 3

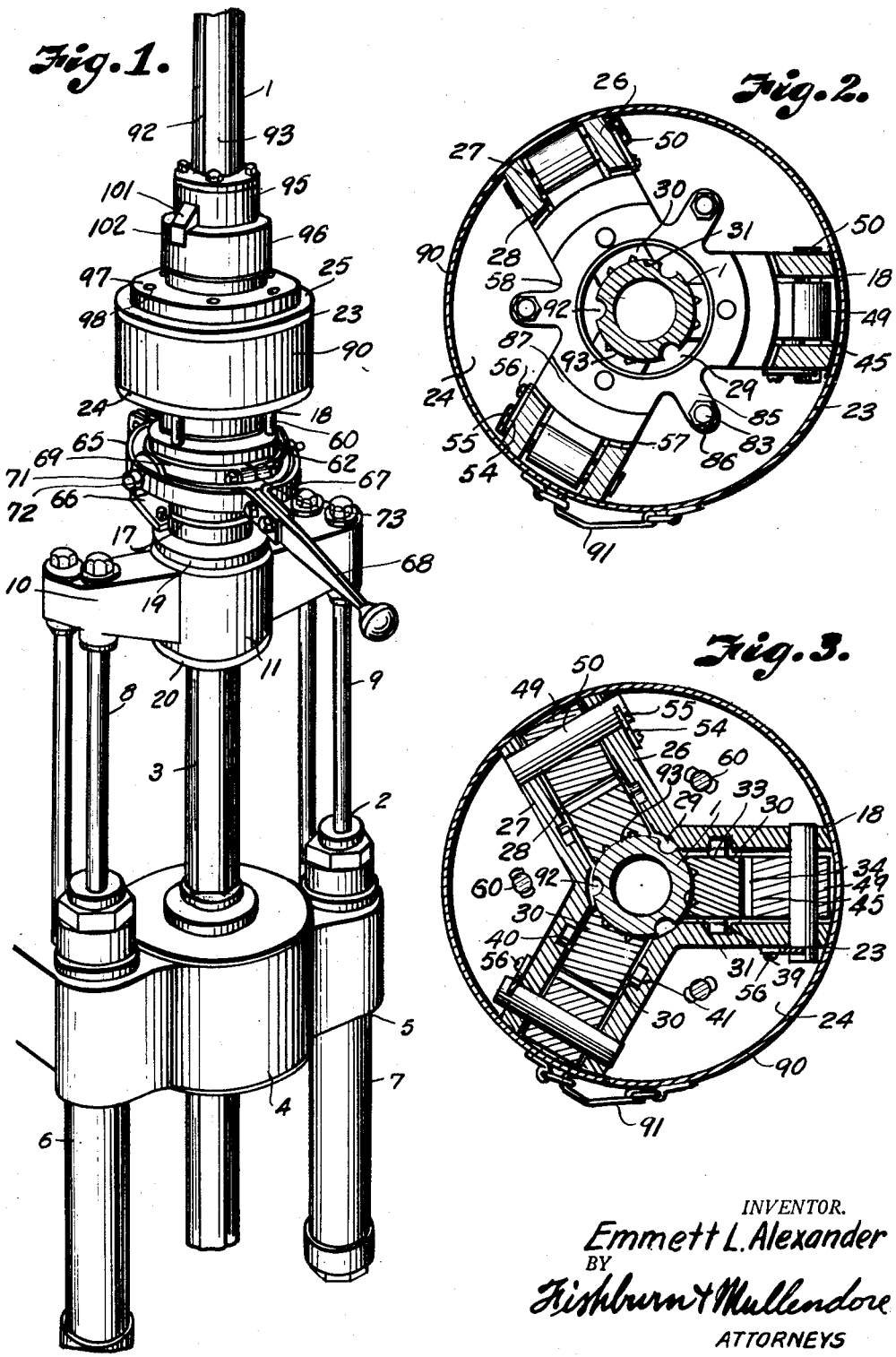

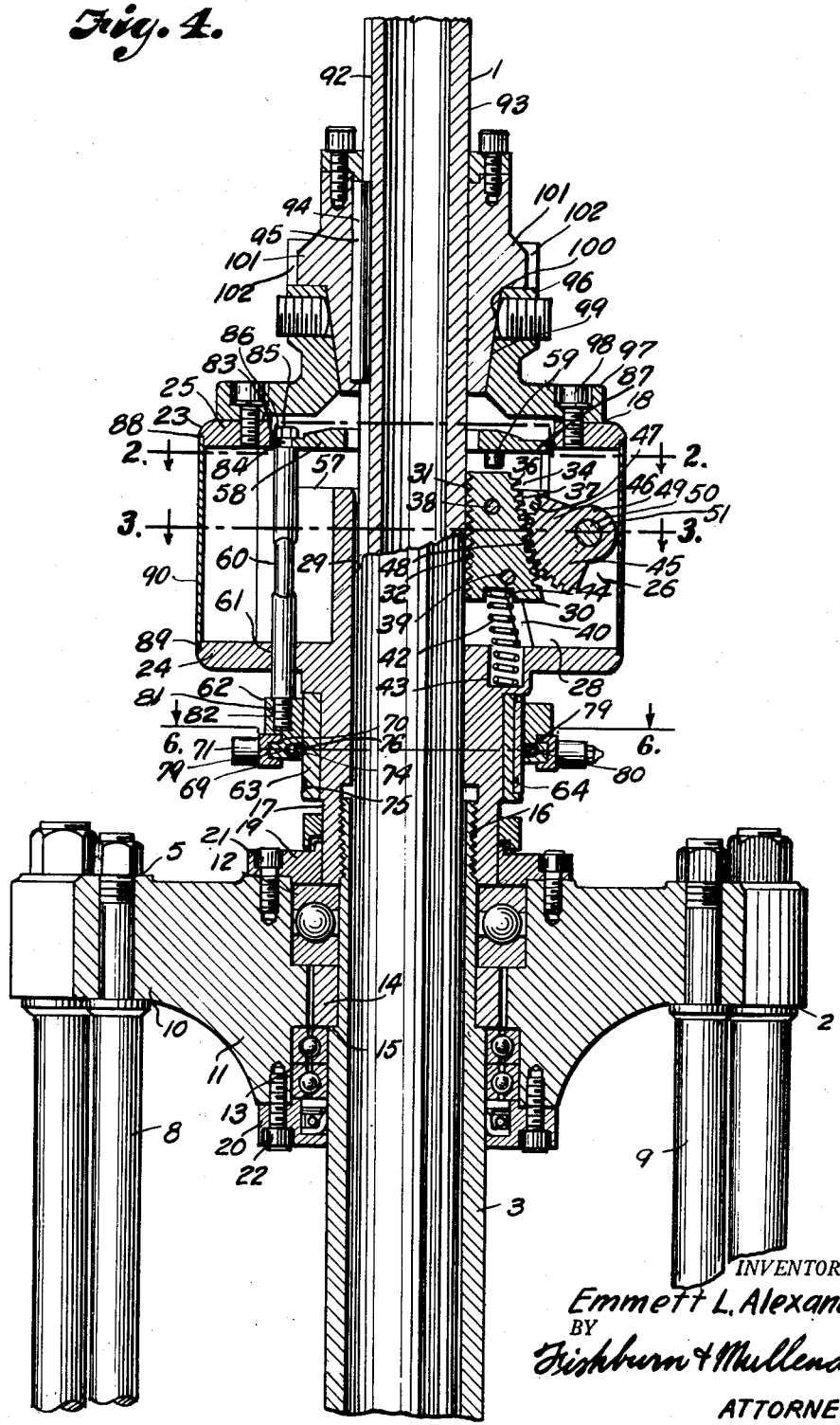

INVENTOR.
Emmett L. Alexander.
BY
Fishburn & Mullendore
ATTORNEYS

Patented Dec. 19, 1950

2,534,213

UNITED STATES PATENT OFFICE 2,534,213

PULLDOWN DEVICE FOR ROTARY DRILLING APPARATUS

Emmett Lee Alexander, Enid, Okla., assignor to The George E. Failing Supply Company, Enid, Okla., a corporation of Oklahoma Application June 24, 1946, Serial No. 678,977

9 Claims. (Cl. 255—22)

This invention relates to rotary drilling equipment and more particularly to an automatic chuck mechanism including a rotary driving connection for the kelly rod which is employed with such equipment.

When drilling a well with rotary equipment, a string of drill pipe carrying the drill bit on the lower end is suspended from the kelly rod. The kelly has exterior grooves or ways adapted to slidably receive keys or the equivalent carried in a drive bushing rotated by the rotating mechanism of the drilling unit. At times during the drilling operation it is desirable to supplement the pressure of the drill pipe on the drill bit and this is effected by a pull-down mechanism that is adapted to be connected with the drill pipe through a jaw chuck that is rotatable with the kelly rod. When such chucks are automatically operated, the gripping jaws may engage anywhere around the periphery of the kelly rod. Consequently, the teeth of the jaws may seriously damage the ways or keying portions of the rod so that it does not slide freely through the drive bushing.

It is, therefore, a principal object of the present invention to provide a structure wherewith the jaws of the automatic chuck at all times work between the kelly grooves or the driving portions engaged with the connecting elements of the drive bushing.

Another object of the invention is to provide an automatic chuck and drive bushing assembly of simple and inexpensive construction and which when in use effects positive gripping and driving connections with the kelly rod of a drilling unit.

A further object of the invention is to provide an automatic chuck structure, the efficiency of which is not effected by the drilling fluid.

In accomplishing these and other objects of the invention hereinafter pointed out, I have provided improved structure, the preferred form of which is illustrated in the accompanying drawings wherein:

Fig. 1 is a perspective view of a portion of a rotary drilling mechanism equipped with an automatic chuck and drive bushing assembly embodying the features of the present invention.

Fig. 2 is a horizontal section through the chuck on the line 2—2 of Fig. 4.

Fig. 3 is a similar section on the line 3—3 of Fig. 4.

Fig. 4 is a vertical longitudinal section through the upper portion of the drilling unit and the automatic chuck and bushing assembly.

Figures 5, 6:
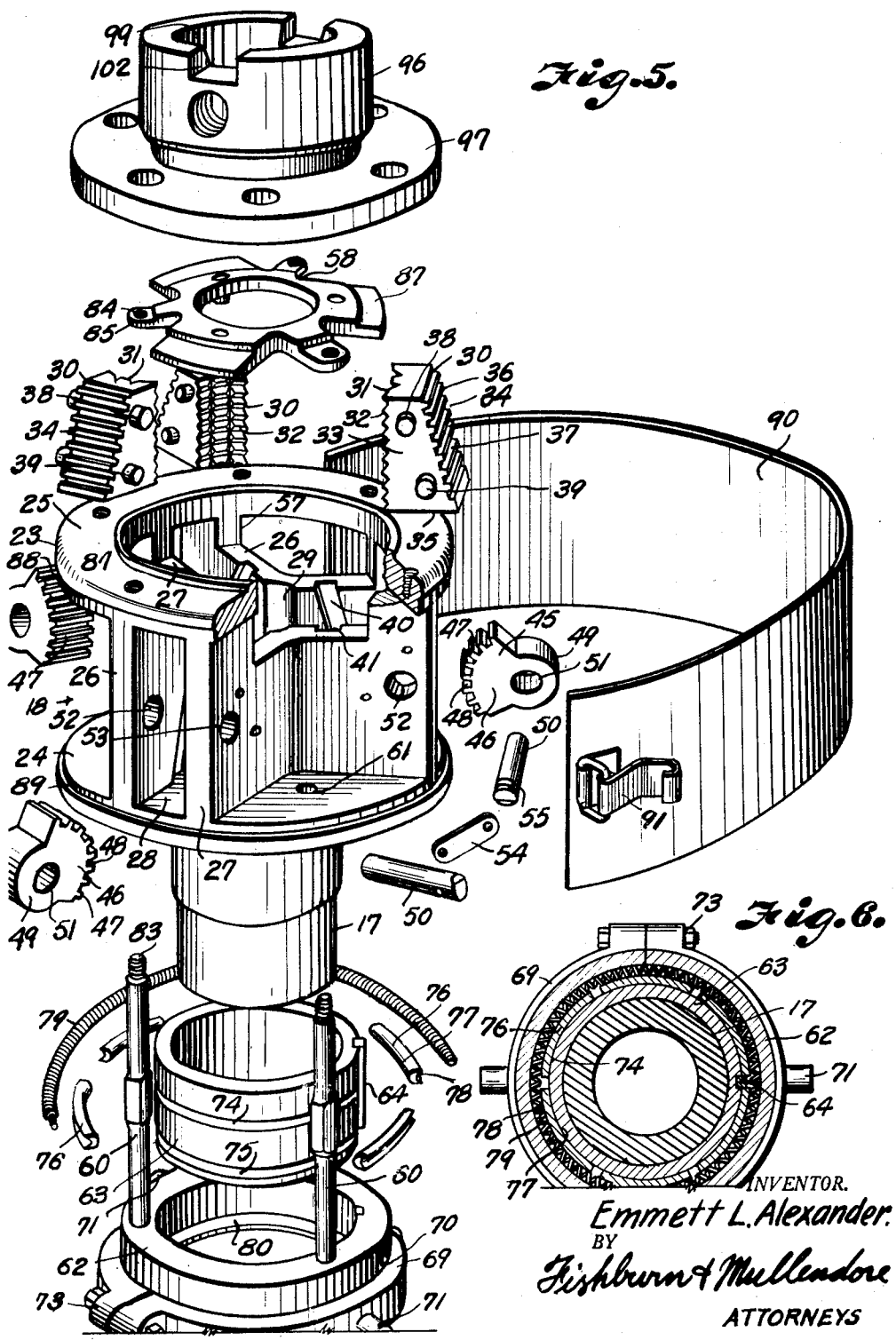
Fig. 5 is a perspective view of the parts of the automatic chuck shown in disassembled spaced relation to better illustrate the construction thereof.
Fig. 6 is a horizontal section on the line 6—6 of Fig. 4.

Referring more in detail to the drawings:

1 designates a portion of a kelly rod that is connected at its lower end with a drill pipe (not shown) and at its upper end with a swivel head (also not shown) by which the drill pipe is suspended and through which a drilling fluid is circulated by way of the drill pipe to the bottom of the borehole being drilled. A drill bit (also not shown) is attached to the lower end of the drill pipe. The kelly rod is rotated to effect cutting of the bit by a rotary drilling unit 2 and includes a tubular drive rod 3 through which the kelly rod 1 extends.

The unit 2 also includes a drive rod rotating mechanism indicated by the housing 4 and a pull-down unit 5 which, in the illustrated instance, includes a pair of hydraulic cylinders 6 and 7 having piston rods 8 and 9 reciprocable therein to raise and lower a yoke 10 that is connected with the upper ends thereof. The yoke 10 includes a collar 11 having bearings 12 and 13 for journalling the upper end of the drive rod 3, the lower end being slidably projectable through the housing 4 and the exterior is suitably shaped to provide a sliding driving connection with the rotary element of the rotating mechanism as in standard rotary drilling equipment. The upper end of the kelly rod is fixed to the yoke 10 for movement therewith by means of a sleeve 14 encircling the kelly rod intermediate the bearings 12 and 13 and engaging an annular shoulder 15 on the kelly rod. The reduced end of the kelly rod has a threaded terminal 16 projecting through the collar 11 of the yoke 10 and which mounts the internally threaded neck 17 of the automatic chuck 18 embodying the features of the present invention. The bearings 12 and 13 are retained in the collar of the yoke by rings 19 and 20 attached thereto by suitable fastening devices such as cap screws 21 and 22.

The chuck 18 includes a head 23 supported coaxially on the neck 17 and which includes a lower plate-like portion 24 connected with an upper ring portion 25 by a plurality of laterally arranged pairs of wings or partitions 26 and 27, spaced apart to provide jaw compartments 28 therebetween. The pairs of wings 26 and 27 are arranged about a central passageway 29 through which the kelly rod extends. Mounted in each jaw compartment is a jaw 30 having inner faces 31 conforming to the face portion of the kelly rod 1 to be gripped thereby and equipped with teeth 32. The sides 33 of the jaws conform with the sides of the wings 26 and 27 and the jaws are of a width so that they are freely accommodated in the compartments 28 without danger of binding or jamming in case drilling fluid should enter the chuck. The rear faces 34 of the jaws are inclined upwardly and inwardly from the lower ends 35 and are provided with a plurality of rack teeth 36 having spaces 37 therebetween. The jaw compartments are of a height to permit vertical movement of the jaws therein whereby the jaws can be moved into and out of contact with the kelly rod. The jaws are loosely guided in the compartments by upper and lower pairs of lugs 38 and 39 engaging in guide grooves 40 and 41 formed in the inner faces of the wings. The grooves 40 and 41 incline upwardly and inwardly at an angle conforming with the inclination of the rear faces 34 of the jaws 30 so that when the jaws are moved vertically within the jaw compartments, the jaws are caused to move to and from contact with the kelly rod 1 and the pairs of lugs 38 and 39 retain the gripping faces 31 of the jaws in substantially parallel relation with the kelly rod. The jaws are normally urged into contact with the kelly by coil springs 42 having their lower ends seated in sockets 43 provided in the plate portion 24 and their upper ends are seated in sockets 44 formed in the lower ends 35 of the jaws as best shown in Fig. 4.

In order to provide positive backing for the jaws and to maintain freedom of movement thereof and particularly of the lugs in the guide grooves 40 and 41 of the wings 26 and 27, I provide backing members which may be in the form of gear segments 45. The gear segments substantially correspond to the width of the jaws and which have sector-shaped portions 46 provided with transverse teeth 47 adapted to engage in the spaces 37 between the teeth 36 of the jaws and which have spaces 48 therebetween to accommodate the teeth of the jaws. The gear segments have hub portions 49 mounted on pins or shafts 50 extending through axial openings 51 in the segments and having the ends mounted in transversely registering openings 52 and 53 of the wings. The pins or shafts 50 are located with respect to the jaws so that when the jaws are in their uppermost position and in contact with the kelly rod the teeth of the segments have proper meshing contact with the teeth of the jaws, that is, the teeth of the segments have the desired working clearance. It is also to be understood that the teeth are of a size and number so as to provide multiple contacts between the jaws and gear segments. The pins or shafts 50 are retained in position by key plates 54 having portions engaged in notches 55 formed in projecting ends of the pins. The ends of the key plates are secured to the outer faces of the wings by suitable fastening devices such as screws 56 (Fig. 2).

Portions of the wings are cut away at the upper ends thereof as at 57 to cooperate with the ring portion 25 of the head 23 to provide space for accommodating a jaw depressing ring 58 that encircles the kelly rod and has depending lugs 59 adapted to engage the upper end face of the respective jaws as best shown in Fig. 4. Fixed to the ring at points intermediate the pairs of wings of the chuck are rods 60 having the lower ends thereof slidably mounted in bearing openings 61 in the plate portion 24 of the head 23 as shown in Fig. 4. The lower end of the rods are connected with a shift collar 62 encircling a collar-like bushing 63 on the upper portion of the neck 17. The shift collar is keyed to the bushing by a key 64 and is moved along the bushing by a lever 65 pivotally mounted on a bracket 66 carried at one side of the yoke 10 and which has a yoke-like ring portion 67 carrying a handle 68 projecting from the opposite side of the yoke 10 and in convenient reach of the operator of the drill. The ring portion 67 connects with the collar through a ring 69 having its inner periphery mounted within an annular groove 70 of the collar. The ring carries diametrically opposed pins 71 journalled in bearing openings 72 of the ring portion of the lever 64. The ring 69 is preferably formed in two sections bolted together as indicated at 73 to facilitate assembly of the parts. The jaw shifting plate has two positions, one where the lugs 59 are retained in spaced relation with the upper ends of the jaws when the jaws are in gripping contact with the kelly rod and another position where the lugs of the plate are in engagement with the upper ends of the jaws and the jaws are in fully expanded position relative to the kelly rod.

In order to retain the jaw shifting plate 58 in these respective positions, the bushing is provided with spaced annular grooves 74 and 75 for arcuate-shaped latch sections 76 having rounded inner faces 77 to facilitate movement into and out of the grooves and grooved outer faces 78 for seating a coil spring 79 encircling the latch sections and having its ends secured together so that the spring yieldingly urges the latch sections against the bushing 63 and into one or the other of the respective grooves 74 or 75 depending upon the position of the collar. The latch sections 76 and spring 79 are supported within an annular groove 80 of the shift collar 62 so that they are carried therein. The rods 60 have lower threaded terminals 81 engaged in sockets 82 formed in the upper face of the shift collar. The upper ends have similar terminals 83 extending through openings 84 in radially extending ears 85 on the jaw shifting plate 58 and which are retained therein by nuts 86 threaded on projecting ends of the terminals. The jaw shifting plate 58 also includes wings 87 intermediate the ears to carry the lugs 58 and to provide covers for the jaw compartments.

Attention is directed to the fact that spaces provided between the wings 87 and ears 85 permit free operation of the plate 58 without interference by drilling fluid that may enter the chuck head. The outer periphery of the ring portion 25 and the plate portion 24 of the head are preferably provided with inwardly facing shoulder grooves 88 and 89 to seat the upper and lower edges of a closure band 90 having the ends brought together by a latch 91 of suitable design.

With the construction thus far described and with the jaw shifting plate 58 in its upper position, that is, where the latch segments engage in the groove 74, the springs 42 urge the jaws 30 into contact with the kelly rod 1. Any shifting of the jaws responsive to movement of the springs 42 and kelly rod 1 is reflected in movement of the gear segments 45 through the intermeshing connections therewith. Thus, outward radial pressure on the jaws is at all times resisted by the gear segments. Likewise, movement of the chuck head relative to the jaws effects rocking movement of the gear segments relatively to the jaws. For example, when the jaws are in contact with the kelly rod and a pull-down pressure is applied to the yoke 10 through the piston rods 8 and 9, the gear segments rotate in a direction to cause upward movement of the jaws through the teeth connections and due to the inclination of the racks and wedge shape of the jaws, pressure is applied between the gear segment supporting pins or shafts 50 and the kelly rod 1 to effect positive gripping engagement of the teeth of the jaws with the kelly rod. Therefore, when the pull-down force is applied to the yoke it is transmitted to the kelly rod through the chuck head, mounting pins 50, gear segments 45 and jaws 30 to the kelly rod for augmenting pressure of the drill pipe on the bit.

The kelly rod is provided with circumferentially spaced longitudinal grooves or ways 92 that are spaced apart so that the teeth 32 of the jaws 30 are adapted to engage the portions 93 of the kelly rod intermediate the grooves. Engaged in the grooves 92 are keys 94 carried by a drive bushing 95 adapted to be rotated by the drive rod 3. It is, therefore, desirable that the kelly maintain a fixed position relative to the jaws so that the jaws at all times contact the portions 93 of the kelly intermediate the grooves. Otherwise, contact of the jaws at the points of the grooves limits the effective contact area and the sides of the grooves might be distorted so as to interfere with free vertical movement of the kelly. The drive bushing 95 is, therefore, carried by a drive sleeve or nut 96 carried by a plate 97 closing the open top of the chuck head 23 and fixed to the ring portion 25 by fastening devices such as cap screws 98. The drive sleeve has a tapered bore 99 opening from the upper end thereof to seat a tapered portion 100 of the drive bushing 95. The drive bushing 95 has laterally extending lugs 101 engaged in notches 102 formed in the drive sleeve 96 so that when the automatic chuck is rotated, the drive sleeve 96 carried therewith effects rotation of the drive bushing 95 through the lug and notch engagement. The lug and notch engagement also maintains a fixed definite relationship of the kelly with the jaws so that the portions 93 of the kelly intermediate the grooves 92 are always in position to be engaged by the teeth 32 of the jaws.

In operation, the kelly rod 1 carrying the drive bushing 95 is lowered through the passageway 29 of the automatic chuck 18 and through the drive bushing 95 to connect with the drill pipe (not shown) as in regular drilling practice. Assuming that the yoke 10 is in its lowermost position, pressure fluid is admitted to the hydraulic cylinders 6 and 7 to raise the piston rods 8 and 9 therein and raise the yoke to its upper position so that the automatic chuck 18 is in position to grip the kelly rod when the yoke is moved downwardly.

During upward movement of the automatic chuck 18, the jaws 30 ride freely along the kelly. Downward shifting of the jaws effects rotation of the gear segments to release gripping pressure on the jaws. When the automatic chuck is in its upper position the springs 42 maintain the jaws in gripping contact with the kelly and the gear segments 45 follow the jaws so that the jaws are backed thereby.

When the yoke is moved downwardly the chuck is reversed by applying fluid pressure on the upper sides of the pistons in the cylinders 6 and 7, the jaws are caused to wedge against the kelly and apply downward pressure thereon. Simultaneously, the drive rod is rotated to rotate the kelly rod and effect operation of the drill bit. When the pistons of the hydraulic cylinders have approached the bottom of their stroke, the direction is reversed again to raise the automatic chuck for effecting another grip on the kelly rod.

If it is desired to manually release the jaws, the handle 68 of the lever 65 is gripped by the operator to move the shift collar 62 downwardly on the bushing so that the latch sections engage the lowermost groove 75. This movement of the shift collar moves the jaw shifting plate 58 into position so that the lugs 59 thereon engage the upper ends of the jaws and move them downwardly against action of the springs 42.

During this movement of the jaws, the lugs 38 and 39 move in the inclined ways or grooves 40 and 41 allowing the toothed faces 31 of the jaws to move away from the kelly and the downward movement of the jaws effects rotation of the gear segments 45 to maintain backing support for the jaws. When it is desired to again bring the jaws into contact with the kelly, the lever 65 is shifted so that the collar 62 is moved upwardly on the bushing 63 to permit engagement of the latch sections 76 with the uppermost groove 74, at which time the plate 58 is raised sufficiently by the rods 60 to allow the spring 42 to again become effective and move the jaws into contact with the kelly rod.

In case drilling fluid enters the chuck head, it will not interfere with operation of the jaws since any fluid or drilling mud between the gear segments and racks of the jaws will be exuded through the clearance spaces at the roots of the respective teeth.

From the foregoing it is obvious that I have provided drilling equipment wherein the jaws of the automatic chuck at all times work between the kelly grooves, that is, upon the portions of the kelly to be gripped by the jaws.

It is also obvious that I have provided an automatic chuck and driving bushing assembly of simple and inexpensive construction which, when in use, effects positive gripping and driving connections with the kelly rod of a drilling unit.

What I claim and desire to secure by Letters Patent is:

1. A device of the character described including a kelly rod, kelly rod rotating means, a pull-down unit having a yoke journalling said rotating means, an automatic chuck head having a neck portion for direct connection with said rotating means, a drive sleeve fixed to the chuck head on a side opposite said neck portion, jaws movable in said head for movement into and out of gripping contact with the kelly rod, springs urging the jaws into gripping contact with the kelly rod, backing means in said head for engaging the jaws, a jaw shifting plate encircling the kelly rod between the drive sleeve and said jaws and having lugs engageable with upper ends of the jaws to move the jaws, a collar slidable on the neck portion, means connecting the collar with the jaw shifting plate, and a lever member pivoted to the yoke and connected with the collar for shifting the collar on said neck portion.

2. A device of the character described including a kelly rod, kelly rod rotating means, a pull-down unit having a yoke journalling said rotating means, an automatic chuck head having a neck portion connected with said rotating means, a drive sleeve fixed to the chuck head on a side opposite said neck portion, jaws movable in said head and arranged about the kelly rod, springs urging the jaws into gripping contact with the kelly rod, backing means in said head for engaging the jaws, a collar slidable on said neck portion, rods carried by the collar and extending into the head of said chuck at points intermediate the jaws, a shift plate carried by said rods in encircling relation with the kelly rod at a point intermediate the drive sleeve and said jaws and engageable with the upper ends of the jaws to move the jaws against action of the spring, and a lever member pivoted to the yoke and connected with the collar for shifting the collar on said neck portion.

3. A device of the character described including a kelly rod, kelly rod rotating means, a pulldown unit having a yoke journalling said rotating means, an automatic chuck head having a neck portion having direct positive connection with said rotating means, jaws movably supported in said head and arranged about the kelly, springs urging the jaws into gripping contact with the kelly rod, backing means in said head for engaging the jaws, a drive member carried by said head and separate from said direct connection and having a drive bushing engaging seat, a drive bushing in said seat, key members carried by the drive bushing and engaging grooves in said kelly rod for connecting the kelly rod with said rotating means, a collar slidable on said neck portion and rotatable with said chuck head, rods carried by the collar and extending into the head of said chuck at points intermediate the jaws, a shift plate carried by said rods within said chuck head in encircling relation with the kelly and having means engageable with upper ends of the jaws to move the jaws out of contact with the kelly rod, a lever member pivoted to the yoke and connected with the collar for shifting the collar on said neck portion, and latch means carried by the collar for holding said shift plate in and out of jaw engagement.

4. An automatic chuck including a head having a neck portion adapted for direct connection with a rotatable member, a plate portion carried by the neck portion, an upper ring portion and pairs of radially arranged wings connecting the plate and ring portions, said wings being spaced apart to provide jaw compartments therebetween and having inclined ways in facing sides thereof, a kelly rod driving connection mounted on the upper ring portion, jaws in said compartments having lugs engaged in said ways, springs for urging the jaws in one direction in said ways, and means carried in said compartments for backing said jaws, a collar reciprocable on the neck portion and adapted to rotate with said head, a shift plate located within said head above said wing portions and having means for engaging the jaws, means interconnecting the shift plate with the collar, and means for shifting the collar on said neck portion for disengaging the jaws from a kelly rod adapted to be gripped thereby.

5. An automatic chuck including a head having a lower plate portion, an upper ring portion having a neck portion adapted to be connected with a driving member and pairs of radially arranged wings connecting the plate and ring portions, a drive sleeve mounted on the upper ring portion, said wings being spaced apart to provide jaw compartments therebetween and having inclined ways in facing sides thereof, jaws in said compartments having lugs engaged in said ways and having inclined backs corresponding to the inclination of said ways, and means carried in said compartments for backing said jaws, said backing means including gear segments having teeth engaged with teeth on the back of said jaws, springs having ends engaging the plate portion and lower ends of the jaws to urge the jaws upwardly in said compartments, and means for moving the jaws in opposition to said springs including a shift collar slidable on said neck portion.

6. An automatic chuck including a head having a neck portion connected with a rotary driving member, jaws movable in said head and arranged about a kelly rod passageway through said head and neck portion, springs urging the jaws in one direction, a collar slidable on said neck portion, rods carried by the collar and extending into the head of said chuck at points intermediate the jaws, a drive sleeve mounted on a side of the head opposite said neck portion, a shift plate carried by said rods intermediate the drive sleeve and said jaws, and a lever member connected with the collar for shifting the collar on said neck portion to move the shift plate for moving the jaws in opposition to said springs.

7. In combination with a kelly rod, means for rotating the kelly rod and means for applying a pulldown force on the kelly rod, an automatic chuck rotatably carried by and having direct connection with the pulldown means, said automatic chuck having jaws for engaging the kelly rod, a drive bushing collar carried upon and rigidly fixed to the automatic chuck on a side opposite said pulldown means, and a drive bushing removably seated in said collar and having sliding keyed connection with said kelly rod whereby the drive bushing is removable when the kelly rod is withdrawn from said automatic chuck.

8. A device of the character described including a kelly rod, a rotating mechanism, a pulldown unit, an automatic chuck head having a positive connection with said rotating means, jaws in said head and arranged about the kelly rod for gripping the kelly rod, backing means in said head for engaging the jaws, a drive member carried by said head above said jaws and having a drive bushing engaging seat and upwardly facing lug receiving grooves, a drive bushing in said seat and having lugs removably engaging in said grooves, key members carried by the drive bushing and engaging grooves in said kelly rod for connecting the kelly rod with said rotating mechanism, said drive bushing being removable from the seat of the drive member when the kelly rod is withdrawn upwardly through the chuck head.

9. An automatic chuck assembly including, a head having a lower plate portion and an upper ring portion, pairs of radially arranged wings connecting the plate and ring portions, said wings being spaced apart to provide jaw compartments therebetween and having inclined ways in facing sides thereof, jaws in said compartments having lugs engaging in said ways, springs for urging the jaws in one axial direction in said ways, a drive member having a plate portion attached to said upper ring portion and having an upwardly facing drive bushing engaging seat, a drive bushing removable upwardly from said seat, and a driving connection on the lower plate portion having means adapted for attachment to a drive rod.

EMMETT LEE ALEXANDER.

REFERENCES CITED

The following references are of record in the file of this patent:

UNITED STATES PATENTS

| Number | Name | Date |
|---|---|---|
| 1,690,469 | Whinnen | Nov. 6, 1928 |
| 2,393,603 | Beeth | Jan. 29, 1946 |